(No Model.)
A. J. EDDY.
MEAT CUTTER.
No. 347,477. Patented Aug. 17, 1886.
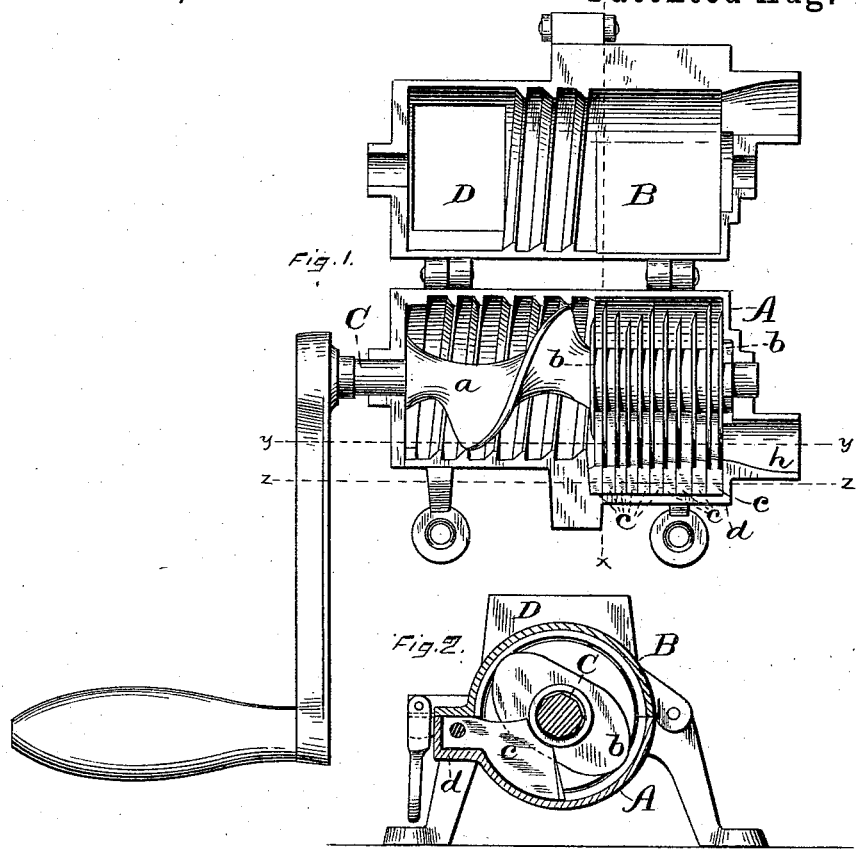
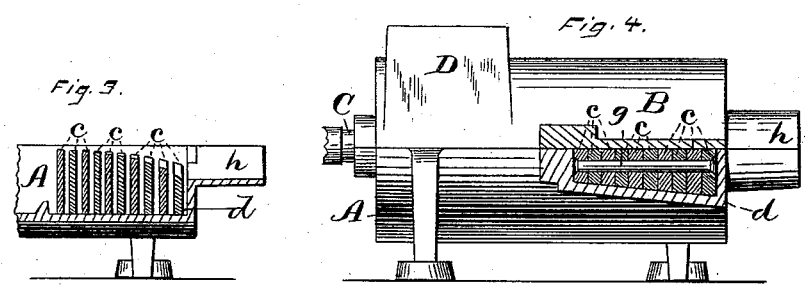
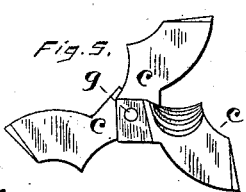
Witnesses.
John Edwards Jr.
Charles C. Mitchell
Inventor.
Alfonzo J. Eddy.
By James Shepard
Atty.

UNITED STATES PATENT OFFICE.

ALFONZO J. EDDY, OF NEW BRITAIN, CONNECTICUT, ASSIGNOR TO THE RUSSELL & ERWIN MANUFACTURING COMPANY, OF SAME PLACE.

MEAT-CUTTER.

SPECIFICATION forming part of Letters Patent No. 347,477, dated August 17, 1886.

Application filed December 28, 1885. Serial No. 186,836. (No model.)

*To all whom it may concern:*

Be it known that I, ALFONZO J. EDDY, a citizen of the United States, residing at New Britain, in the county of Hartford and State of Connecticut, have invented certain new and useful Improvements in Meat-Cutters, of which the following is a specification.

My invention relates to improvements in meat-cutters of the class which have a set of rotary cutters and stationary shear-blocks; and the object of my improvement is to increase the efficiency of the machine.

In the accompanying drawings, Figure 1 is a plan view of my meat-cutter with the case opened. Fig. 2 is a transverse section of the same with the case closed, the plane of section being indicated by the line $x\ x$, Fig. 1. Fig. 3 is a vertical section on line $y\ y$, Fig. 1, of a part of my cutter—viz., a portion of the case and shear-blocks. Fig. 4 is a like view of my cutter, partly in elevation, the plane of section being indicated by the line $z\ z$, Fig. 1; and Fig. 5 is a detached side elevation of the shear-blocks with part of them turned on their connecting-rod.

A designates the lower part of the case, and B the upper part. The shaft C has a spiral flange or feeding-screw, $a$, at one end and a gang of cutters at its other end. The shaft at the cutter end is octagonal, and the hole in the oblong cutters $b$ is of a corresponding form, so that as said cutters are slipped on the shaft, with washers between them, they can be arranged to stand with the points of one cutter one-eighth of a revolution in advance of the adjoining cutter, and so on throughout the series. A shaft having a feeding-screw at one end and a gang of spirally-arranged cutters at the other end is old in meat-cutters and not of my invention. The case is provided with a hopper, D, and on its inside with inclined ribs over that portion of the length of the case which is occupied by the feeding-screw $a$. The cutters act against a gang of shear-blocks, $c$, set in the lower part, A, of the case within a socket, $d$, the bottom of which socket slants toward the delivery end of the case. These shear-blocks are connected by a rod, $g$, Figs. 4 and 5, which extends through their shanks. The general form of the shear blocks is best seen in Fig. 2. Their bottom edge is fitted to and rests upon the bottom of the socket $d$ and inner wall of the case. At their upper inner corners they are fitted closely up against the periphery of the washers between the cutters on the shaft, as shown, so that the meat cannot pass around with the cutters. The shanks of the shear-blocks are thicker than their bodies, so as to form spaces between the shear-blocks for the cutters to pass through. The shear-blocks may be made of uniform thickness throughout and properly spaced on the rod $g$ by suitable filling. The knives shear against that side of the shear-blocks which faces the feeding-screw, with the exception of the last cutter, which shears against the end of the case at the spout $h$. The tops of the shear-blocks, in so far as some features of my invention is concerned, may be all of the same height, but the best construction, according to my present belief, is to make the cutting-edge of the first block the highest and slightly concave, as shown in Fig. 2, the cutting-edge of the next block more concave and a little lower, so that the series or gang of blocks at the middle portion of their cutting-edges presents a surface which gradually slants toward the delivery-spout $h$, as shown in Figs. 3 and 5. With shear-blocks thus formed and held on the rod $g$ they only require to be slipped into place within the socket and case, and can readily be removed for cleaning when desired. Turning them into different positions on the rod will make nearly the entire surface of said blocks accessible for cleaning.

By making the series of shear-blocks so as to present a surface which gradually slants toward the delivery-spout, as described, the spout used in connection therewith can be cast in halves on the two parts of the case, while at the same time the shear-blocks are believed to be set in the most effective position. Such construction also facilitates the delivery of the meat from the machine.

A meat-cutter constructed as herein described is very rapid and efficient in its action.

I claim as my invention—

1. In a meat-cutter, the combination of a series of revolving knives with a corresponding series of removable shear-blocks seated in the case, the middle portion of the cutting-edge of the successive shear-blocks being gradually lessened in height as they approach the discharge-spout, substantially as described.

2. The combination of the gang of rotary cutters mounted on a shaft and separated by washers, and the gang of shear-blocks which extend from one side of the case to the periphery of the washers between the cutters, and having their bottom edges resting upon the bottom of the socket $d$ and inner wall of the case, while their upper inner corners are fitted closely up against the periphery of said washers, substantially as described, and for the purpose specified.

3. The combination of the series of rotary cutters, the gang of removable shear-blocks, and the spout $h$, having its inner end formed into a shear-block for the adjoining cutter, substantially as described, and for the purpose specified.

ALFONZO J. EDDY.

Witnesses:
THOS. S. BISHOP,
M. S. WIARD.